United States Patent
Kawai

(10) Patent No.: US 10,853,866 B2
(45) Date of Patent: Dec. 1, 2020

(54) SEARCH METHOD, MEDIUM, AND DEVICE FOR PROVIDING A RESULTS INTERFACE FOR BOTH SINGLE AND MULTIPLE SELLERS

(71) Applicant: Rakuten, Inc., Tokyo (JP)

(72) Inventor: Kohei Kawai, Tokyo (JP)

(73) Assignee: Rakuten, Inc., Tokyo (JP)

( * ) Notice: Subject to any disclaimer, the term of this patent is extended or adjusted under 35 U.S.C. 154(b) by 108 days.

(21) Appl. No.: 16/105,493

(22) Filed: Aug. 20, 2018

(65) Prior Publication Data

US 2018/0357699 A1    Dec. 13, 2018

Related U.S. Application Data

(63) Continuation of application No. 15/103,334, filed as application No. PCT/JP2014/059574 on Mar. 31, 2014, now abandoned.

(51) Int. Cl.
  *G06Q 30/00*   (2012.01)
  *G06Q 30/06*   (2012.01)

(52) U.S. Cl.
  CPC ..... *G06Q 30/0625* (2013.01); *G06Q 30/0603* (2013.01); *G06Q 30/0635* (2013.01)

(58) Field of Classification Search
  CPC ..... G06Q 30/06; G06Q 30/0601–0643; G06Q 30/08; G06F 16/33–338
  See application file for complete search history.

(56) References Cited

U.S. PATENT DOCUMENTS

| | | | |
|---|---|---|---|
| 8,612,306 B1 | 12/2013 | Mukherjee | |
| 9,519,929 B2 * | 12/2016 | Hellal | G06Q 30/02 |
| 9,589,293 B1 * | 3/2017 | Yalamanchi | G06Q 30/0625 |
| 2005/0203878 A1 * | 9/2005 | Brill | G06F 16/9535 |
| 2006/0064411 A1 * | 3/2006 | Gross | G06F 16/90324 |

(Continued)

FOREIGN PATENT DOCUMENTS

| | | |
|---|---|---|
| JP | 10-320422 A | 12/1998 |
| JP | 2002-109334 A | 4/2002 |

(Continued)

OTHER PUBLICATIONS www.bizrate.com [recovered from www.Archive.org on Jul. 20, 2020]. Dated from Apr. 12-13, 2013. (Year: 2013).*

(Continued)

*Primary Examiner* — William J Allen
(74) *Attorney, Agent, or Firm* — Sughrue Mion, PLLC

(57) ABSTRACT

A searching unit 120 searches for products sold in an electronic marketplace according to a query specified by a customer. A product presenting unit 121 presents the searched products to the customer. If the customer selects a product from among the presented products, and the selected product is being sold from a single shop in the electronic marketplace, an ordering unit 122 starts a purchase order for the product by the customer to the single shop. If the selected product is being sold from multiple shops in the electronic marketplace, a shop presenting unit 123 presents the multiple shops to the customer. If the customer selects a shop from among the presented shops, the ordering unit 122 initiates a purchase order for the product selected by the customer to the selected shop.

12 Claims, 18 Drawing Sheets

(56) References Cited

U.S. PATENT DOCUMENTS

| | | | |
|---|---|---|---|
| 2010/0191714 A1* | 7/2010 | Wen | G06Q 30/0623 |
| | | | 707/706 |
| 2014/0297476 A1 | 10/2014 | Wang | |
| 2015/0066973 A1* | 3/2015 | Kim | G06F 16/951 |
| | | | 707/766 |
| 2016/0180423 A1 | 6/2016 | Defoy | |

FOREIGN PATENT DOCUMENTS

| | | |
|---|---|---|
| JP | 2011-133926 A | 7/2011 |
| JP | 2012-252394 A | 12/2012 |

OTHER PUBLICATIONS

International Search Report for PCT/JP2014/059574 dated Jun. 24, 2014.

Product Search in e-shopping: a review and research propositions  Jennifer Rowley, (2000) "Product Search in e-shopping: a review and research propositions"  : Journal of consumer Marketing, vol. 17, Issue 1, pp. 20-35 & nbsp (Year 2000).

English translation of Written Opinion of ISA for PCT/JP2014/059574.

\* cited by examiner

FIG.4

PRODUCT REGISTRATION FORM

INPUT PRODUCT NAME AND PRODUCT INFORMATION

| PRODUCT NAME | |
|---|---|
| PRODUCT INFORMATION | |

TO COMFIRMATION SCREEN

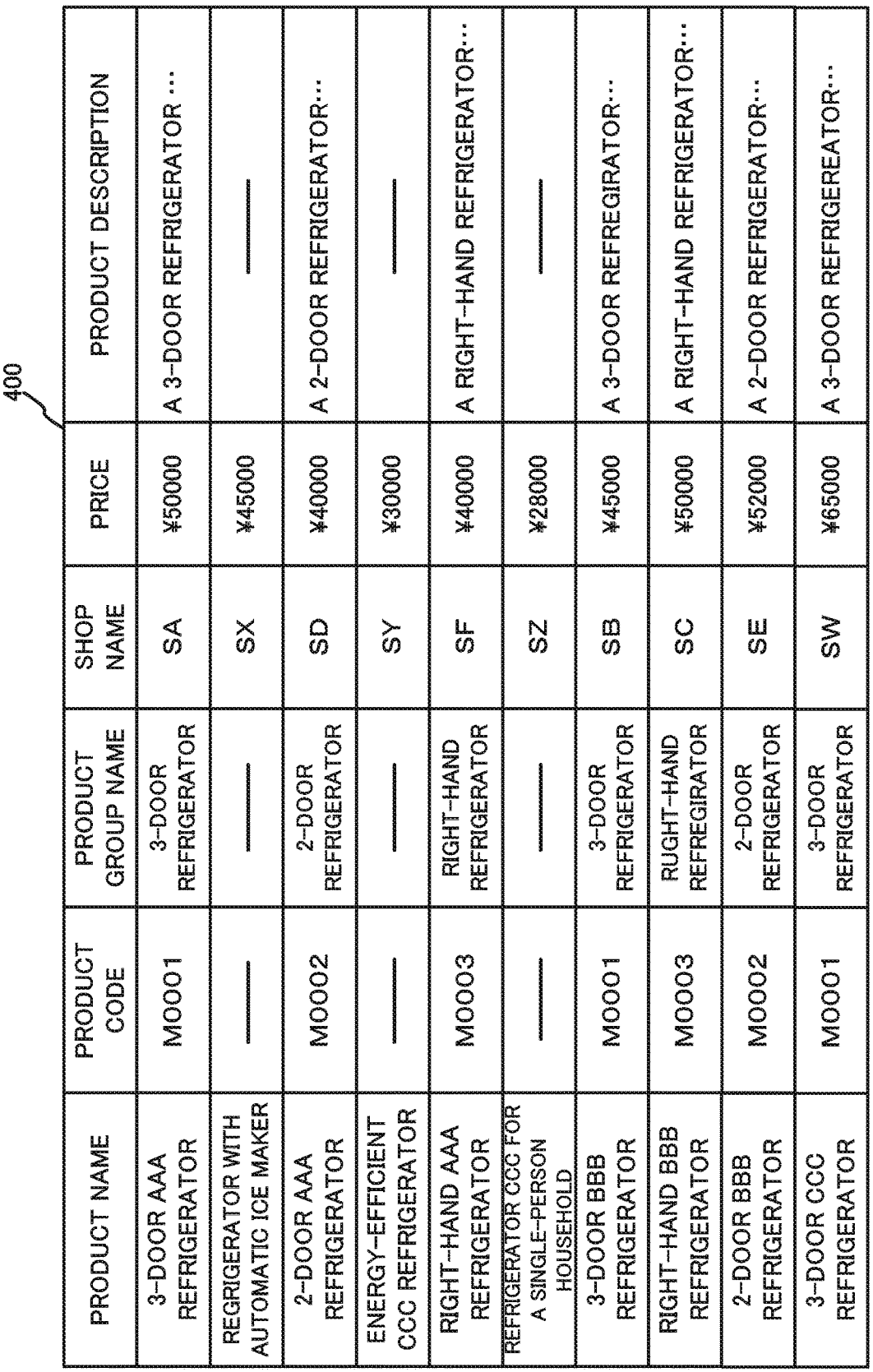

FIG. 5

| PRODUCT NAME | PRODUCT CODE | PRODUCT GROUP NAME | SHOP NAME | PRICE | PRODUCT DESCRIPTION |
|---|---|---|---|---|---|
| 3-DOOR AAA REFRIGERATOR | M0001 | 3-DOOR REFRIGERATOR | SA | ¥50000 | A 3-DOOR REFRIGERATOR… |
| REGRIGERATOR WITH AUTOMATIC ICE MAKER | — | — | SX | ¥45000 | — |
| 2-DOOR AAA REFRIGERATOR | M0002 | 2-DOOR REFRIGERATOR | SD | ¥40000 | A 2-DOOR REFRIGERATOR… |
| ENERGY-EFFICIENT CCC REFRIGERATOR | — | — | SY | ¥30000 | — |
| RIGHT-HAND AAA REFRIGERATOR | M0003 | RIGHT-HAND REFRIGERATOR | SF | ¥40000 | A RIGHT-HAND REFRIGERATOR… |
| REFRIGERATOR CCC FOR A SINGLE-PERSON HOUSEHOLD | — | — | SZ | ¥28000 | — |
| 3-DOOR BBB REFRIGERATOR | M0001 | 3-DOOR REFRIGERATOR | SB | ¥45000 | A 3-DOOR REFRIGERATOR… |
| RIGHT-HAND BBB REFRIGERATOR | M0003 | RUGHT-HAND REFRIGERATOR | SC | ¥50000 | A RIGHT-HAND REFRIGERATOR… |
| 2-DOOR BBB REFRIGERATOR | M0002 | 2-DOOR REFRIGERATOR | SE | ¥52000 | A 2-DOOR REFRIGERATOR… |
| 3-DOOR CCC REFRIGERATOR | M0001 | 3-DOOR REFRIGERATOR | SW | ¥65000 | A 3-DOOR REFRIGEREATOR… |

PRODUCT SCORE FOR SINGLE SHOP

| PRODUCT NAME | PRODUCT SCORE | SHOP NAME | SHOP SCORE | TOTAL SCORE |
|---|---|---|---|---|
| REFRIGERATOR WITH AUTOMATIC ICE MAKER | 45 | SX | 32 | 77 |
| ENERGY-EFFICIENT CCC REFRIGERATOR | 25 | SY | 45 | 70 |
| PERSONAL CCC REFRIGERATOR | 60 | SZ | 30 | 90 |
| ...... | ..... | ...... | ..... | ..... |
| ...... | ..... | ...... | ..... | ..... |

FIG.13

SCORE FOR 3-DOOR REFRIGERATOR

| SHOP NAME | PRODUCT SCORE | SHOP SCORE | TOTAL SCORE |
|---|---|---|---|
| SA | 70 | 45 | 115 |
| SB | 60 | 80 | 140 |
| SW | 55 | 75 | 130 |
| ..... | ..... | ..... | ..... |
| ..... | ..... | ..... | ..... |

| REPRESENTATIVE VALUE |
|---|
| ×× |

FIG.14

SCORE FOR 2-DOOR REFRIGERATOR

| SHOP NAME | PRODUCT SCORE | SHOP SCORE | TOTAL SCORE |
|---|---|---|---|
| SE | 45 | 45 | 45 |
| SD | 45 | 45 | 45 |
| ..... | ..... | ..... | ..... |
| ..... | ..... | ..... | ..... |
| ..... | ..... | ..... | ..... |

| REPRESENTATIVE VALUE |
|---|
| × × |

FIG.15

SOCRE FOR RIGHT-HAND REFRIGERATOR

| SHOP NAME | PRODUCT SCORE | SHOP SCORE | TOTAL SCORE |
|---|---|---|---|
| SF | 45 | 45 | 45 |
| SC | 45 | 45 | 45 |
| ..... | ..... | ..... | ..... |
| ..... | ..... | ..... | ..... |
| ..... | ..... | ..... | ..... |

| REPRESENTATIVE VALUE |
|---|
| ×× |

SEARCH METHOD, MEDIUM, AND DEVICE FOR PROVIDING A RESULTS INTERFACE FOR BOTH SINGLE AND MULTIPLE SELLERS

This is a Continuation Application of U.S. application Ser. No. 15/103,334, filed Jun. 10, 2016, which is a National Stage of International Application PCT/JP2014/059574, filed Mar. 31, 2014, the disclosures of which are incorporated herein by reference.

TECHNICAL FIELD

The present disclosure relates to a purchase management device, a purchase management method, a program, and a non-transitory recording medium.

BACKGROUND ART

In the related art, there exists a product search device in which, when a product search page on a customer terminal is used to perform a search for a product that the customer wants to purchase on a shopping site or an auction site on the Internet, the product search device presents to the customer terminal a search results page displaying a list of product information acquired as search results (for example, see Patent Literature 1).

CITATION LIST

Patent Literature

Patent Literature 1: Unexamined Japanese Patent Application Kokai Publication No. 2011-133926

SUMMARY OF INVENTION

Technical Problem

However, with the product search device, product information from the search results, such as the product name, for example, is displayed in a list, and when there is a plurality of the same product, the plurality of the same product is displayed on the display of the customer terminal. In this case, the number of products other than the plurality of the same product that are displayed on the display becomes limited. Consequently, there is a problem in that the customer becomes unable to view a wide variety of products, and the range of product selection by the customer becomes narrow.

The present disclosure, being devised in light of the above circumstances, takes as an objective to provide a purchase management device, a purchase management method, a program, and a recording medium able to present a wide variety of products to a customer.

Solution to Problem

In order to achieve the above objective, a purchase management device according to a first aspect of the present disclosure includes:

a searching unit that searches for products sold in an electronic marketplace according to a query specified by a customer;

a product presenting unit that presents the searched products to the customer;

an ordering unit that, if the customer selects a product from among the presented products, and the selected product is being sold from a single shop in the electronic marketplace, initiates a purchase order for the selected product by the customer to the single shop; and a shop presenting unit that, if the selected product is being sold from a plurality of shops in the electronic marketplace, presents the plurality of shops to the customer, wherein if the customer selects a shop from among the presented shops, the ordering unit initiates a purchase order for the product selected by the customer to the selected shop.

In the above purchase management device, the shop presenting unit presents a plurality of shops selling the product in a first order of the product sold by the shops, and the product presenting unit presents the products in a second order different from the first order.

In the above purchase management device, the second order of presenting the products may be determined on the basis of scores that reference whether a product is sold from a single shop or sold from a plurality of shops in the electronic marketplace.

In the above purchase management device, the second order of presenting the products may be an order based on scores that reference matches rates of the products against the query, and the first order of presenting the shops may be an order based on scores that reference a price at which each of the plurality of shops sells the product being sold by the plurality of shops.

In the above purchase management device, in the electronic marketplace, if a first product code that a first shop assigns to a first product matches a second product code that a second shop assigns to a second product, the first product and the second product may be treated as the same product, and that same product may be treated as being sold by the first shop and the second shop.

In the above purchase management device, the searching unit may calculate a score expressing a degree to which a combination of a product and a shop selling the product matches the query, the score in the second order of products for a product being sold by a single shop in the electronic marketplace may be a score calculated for a combination of the product and the single shop, and the score in the second order of products for a product being sold by a plurality of shops in the electronic marketplace may be a representative value of scores calculated for respective combinations of the product and the plurality of shops.

In the above purchase management device, the ordering unit may initiate the purchase order by displaying a sales page for selling the selected product, created by the shop to receive the purchase order, the shop presenting unit may present, to the customer, common information associated with a product code assigned to the selected product, together with the plurality of shops selling the selected product, and on the basis of an instruction by any of the plurality of shops or the customer, the purchase management device may extract information other than the common information associated with the product code of the product sold on the sales page from among information included in the sales page, and present the extracted information to the person who gave the instruction.

In order to achieve the above objective, a purchase management method according to a second aspect of the present disclosure is a purchase management method executed by a purchase management device equipped with a searching unit, a product presenting unit, an ordering unit, and a shop presenting unit, the purchase management method including:

a searching step of the searching unit searching for products sold in an electronic marketplace according to a query specified by a customer;

a product presenting step of the product presenting unit presenting the searched products to the customer;

an order processing step of the ordering unit initiating, if the customer selects a product from among the presented products, and the selected product is being sold from a single shop in the electronic marketplace, a purchase order for the product by the customer to the single shop; and a shop presenting step of the shop presenting unit presenting, if the selected product is being sold from a plurality of shops in the electronic marketplace, the plurality of shops to the customer, wherein if the customer selects a shop from among the presented shops, the ordering unit initiates a purchase order for the product selected by the customer to the selected shop.

In order to achieve the above objective, a program according to a third aspect of the present disclosure causes a computer to function as:

a searching unit that searches for products sold in an electronic marketplace according to a query specified by a customer;

a product presenting unit that presents the searched products to the customer;

an ordering unit that, if the customer selects a product from among the presented products, and the selected product is being sold from a single shop in the electronic marketplace, initiates a purchase order for the product by the customer to the single shop; and a shop presenting unit that, if the selected product is being sold from a plurality of shops in the electronic marketplace, presents the plurality of shops to the customer, wherein if the customer selects a shop from among the presented shops, the ordering unit initiates a purchase order for the product selected by the customer to the selected shop.

In order to achieve the above objective, a non-transitory computer-readable recording medium according to a fourth aspect of the present disclosure stores a program causing a computer to function as:

a searching unit that searches for products sold in an electronic marketplace according to a query specified by a customer;

a product presenting unit that presents the searched products to the customer;

an ordering unit that, if the customer selects a product from among the presented products, and the selected product is being sold from a single shop in the electronic marketplace, initiates a purchase order for the product by the customer to the single shop; and a shop presenting unit that, if the selected product is being sold from a plurality of shops in the electronic marketplace, presents the plurality of shops to the customer if the customer selects a shop from among the presented shops, the ordering unit initiates a purchase order for the product selected by the customer to the selected shop.

Advantageous Effects of Invention

According to a purchase management device, a purchase management method, a program, and a non-transitory recording medium in accordance with the present disclosure, a wider variety of products may be presented to a customer.

BRIEF DESCRIPTION OF DRAWINGS

FIG. 4 is a diagram illustrating an example of a product registration page;

FIG. 5 is a diagram illustrating an example of data stored in a product database;

FIG. 12 is a diagram illustrating a score display for products sold at single shop;

FIG. 13 is a diagram illustrating a score display for a product sold at multiple shops;

FIG. 14 is a diagram illustrating a score display for another product sold at multiple shops;

FIG. 15 is a diagram illustrating a score display for another product sold at multiple shops;

DESCRIPTION OF EMBODIMENTS

Hereinafter, exemplary embodiments of the present disclosure will be described with reference to the attached drawings.

Embodiment

Figure 1:
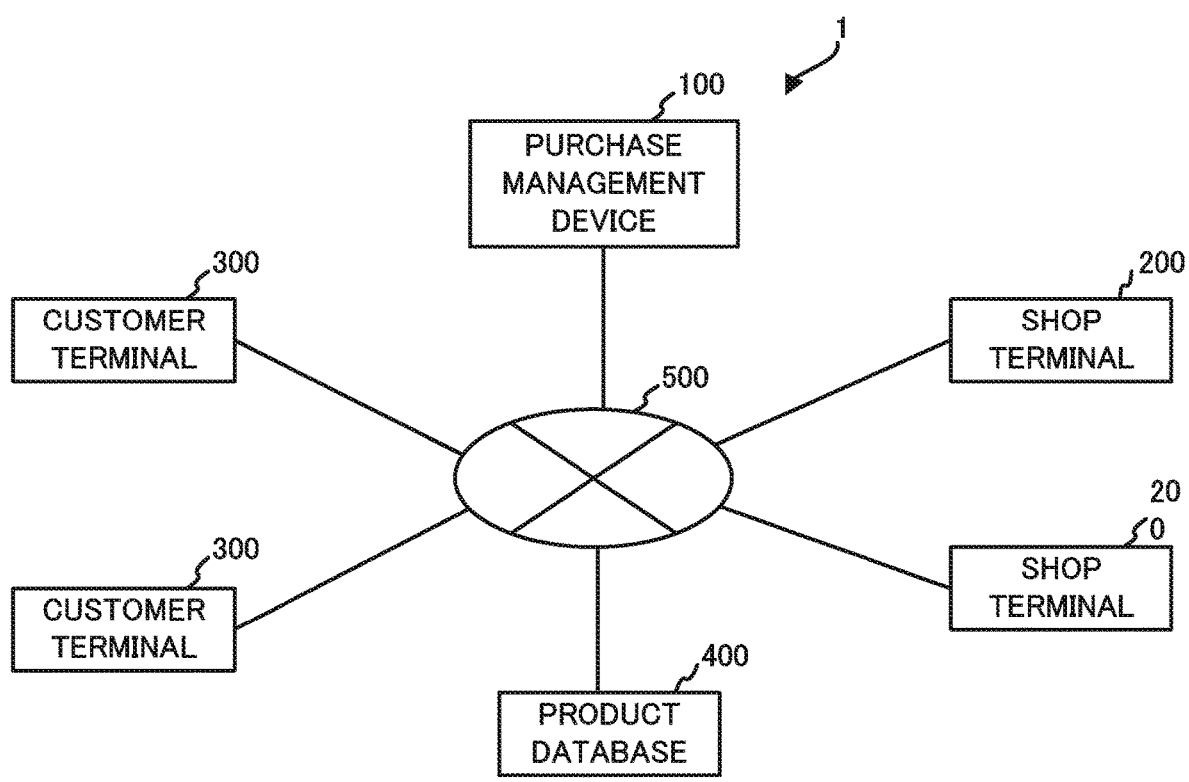
FIG. 1 is a diagram illustrating a purchase management system according an embodiment of the present disclosure.

FIG. 1 illustrates a schematic configuration of a purchase management system 1 according to the present embodiment. The purchase management system 1 is a system that manages products purchased by customers in an electronic marketplace. As illustrated in FIG. 1, the purchase management system 1 includes a purchase management device 100, shop terminals 200, customer terminals 300, and a product database 400. The devices are communicably interconnected via the Internet 500.

The purchase management device 100 is a computer system that, according to a query specified by a customer, searches for products in a product database 400, presents products found by search to the customer, accepts a purchase order, and presents shops. Specifically, the purchase management device 100 acquires product information created on a shop terminal 200, and registers the acquired product information in the product database 400. Subsequently, the purchase management device 100 searches the product database 400 on the basis of a query specified on a customer terminal 300, presents search results to the customer terminal 300, and accepts a purchase order for a product from the customer terminal 300.

The shop terminal 200 is a computer operated by a shop that sells products in the electronic marketplace. The shop terminal 200 accepts the input of information about a product that the shop desires to sell, and transmits the information about the product to the purchase management device 100.

The customer terminal 300 is a computer operated by a customer that purchases products in the electronic marketplace. The customer terminal 300 accepts the input of information about a product that the customer desires to purchase, and transmits the information about the product to the purchase management device 100.

The product database 400 is a device that stores information related to products that shops desire to sell. FIG. 5 illustrates an example of data stored in the product database 400. The product database 400 stores a product name, a product code, a product group name, a shop name of a shop selling the product, a product price, and a product description.

The product name is a product name input by a shop, and is a title for the product that is arbitrarily decided by the shop. The product code is a code assigned to identify a product, such as a JAN code, for example, and is a code assigned to each product according to features such as the product name, price, size, material, capacity, and color. The product code may be assigned by the operator of the electronic marketplace, or assigned by the shop itself. In addition, the product code may also be a product code created independently by the operator of the electronic marketplace. The product group name is a title assigned in correspondence with the product code. The product description is a description treated as common information about a product uniformly determined in correspondence with the product code, and is not stated if a product code is not assigned to a product.

The product database 400 is created by being divided into different genres, for example. The product database 400 illustrated in FIG. 5 is a product database for the genre of refrigerators. In the product database 400 illustrated in FIG. 5, for the product name "3-door AAA refrigerator", the selling shop name is "Shop SA", the price is "50000 yen", the product code is "M0001", the product group name corresponding to the relevant product code M0001 is "3-door refrigerator", and the description "A 3-door refrigerator . . . " is the description of the 3-door refrigerator corresponding to the relevant product code M0001, which are stored in the product database 400. For the product name "Refrigerator with automatic ice maker", a corresponding product code has not been input by the shop or the operator of the electronic marketplace, and thus information is not stored for the product code, the product group name, and the product description. For the product name "3-door AAA refrigerator", the product name "3-door BBB refrigerator", and the product name "3-door CCC refrigerator", the same product code of M0001 has been input by the shop or the operator of the electronic marketplace, and thus the same product group name "3-door refrigerator" is assigned and stored.

Next, a configuration of the purchase management device 100 will be described in detail.

Figure 2:
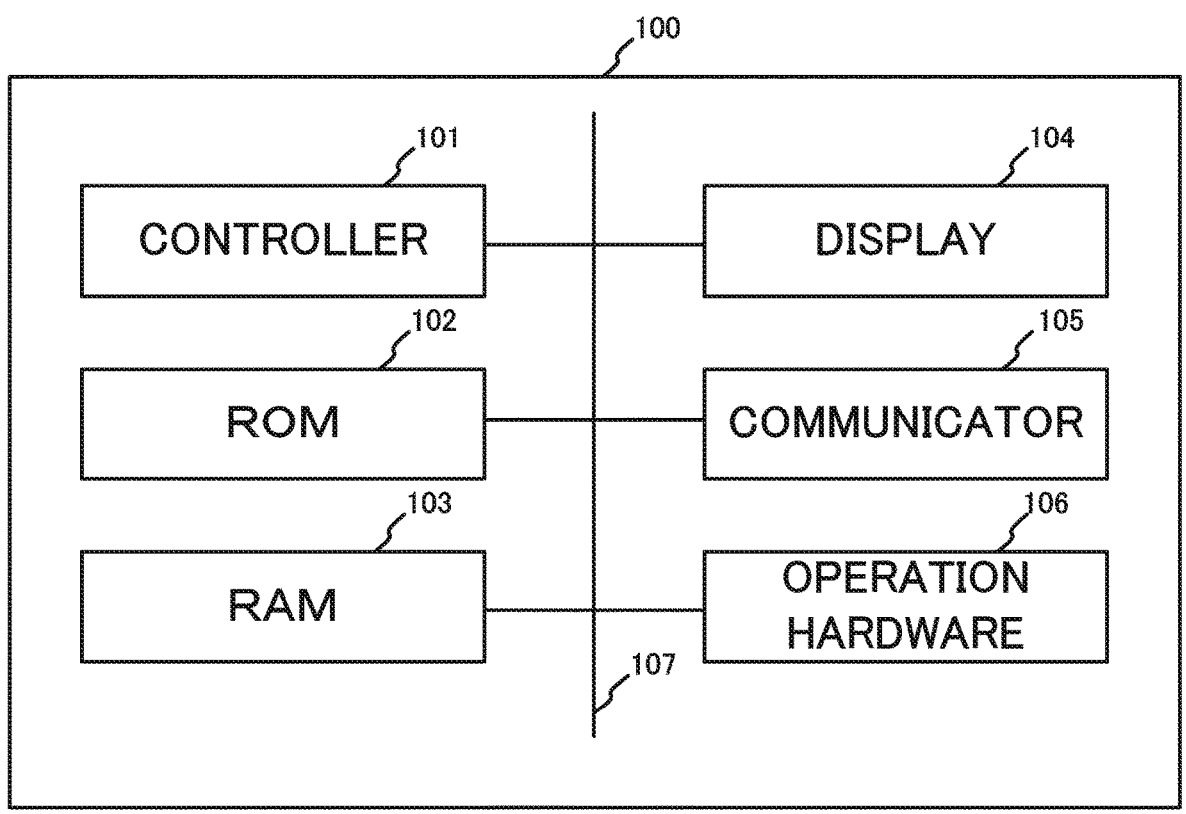
FIG. 2 is a schematic diagram illustrating a hardware configuration of a purchase management device.

FIG. 2 is a schematic block diagram illustrating a hardware configuration of the purchase management device 100.

As illustrated in FIG. 2, the purchase management device 100 is equipped with a controller 101, read-only memory (ROM) 102, random access memory (RAM) 103, a display 104, a communicator 105, and an operation hardware 106. The components are connected by a bus 107.

The controller 101 is made up of a central processing unit (CPU), for example, and controls the purchase management device 100 overall.

The ROM 102 is non-volatile memory that stores programs and various data by which the controller 101 controls the purchase management device 100 overall.

The RAM 103 is volatile memory for temporarily storing information generated by the controller 101 and data required to generate such information.

The display 104 is made up of a display device equipped with a liquid crystal display (LCD) and a backlight. The display 104, under control by the controller 101, displays data output from the controller 101, for example.

The communicator 105 is made up of a communicator for connecting the purchase management device 100 to the Internet 500.

The operation hardware 106 is made up of input devices such as buttons, a touch panel, or a keyboard. The operation hardware 106 receives operating input from a customer or shop, and outputs an operating input signal corresponding to the received operating input to the controller 101.

Next, a functional configuration of the purchase management device 100 will be described.

Figure 3:
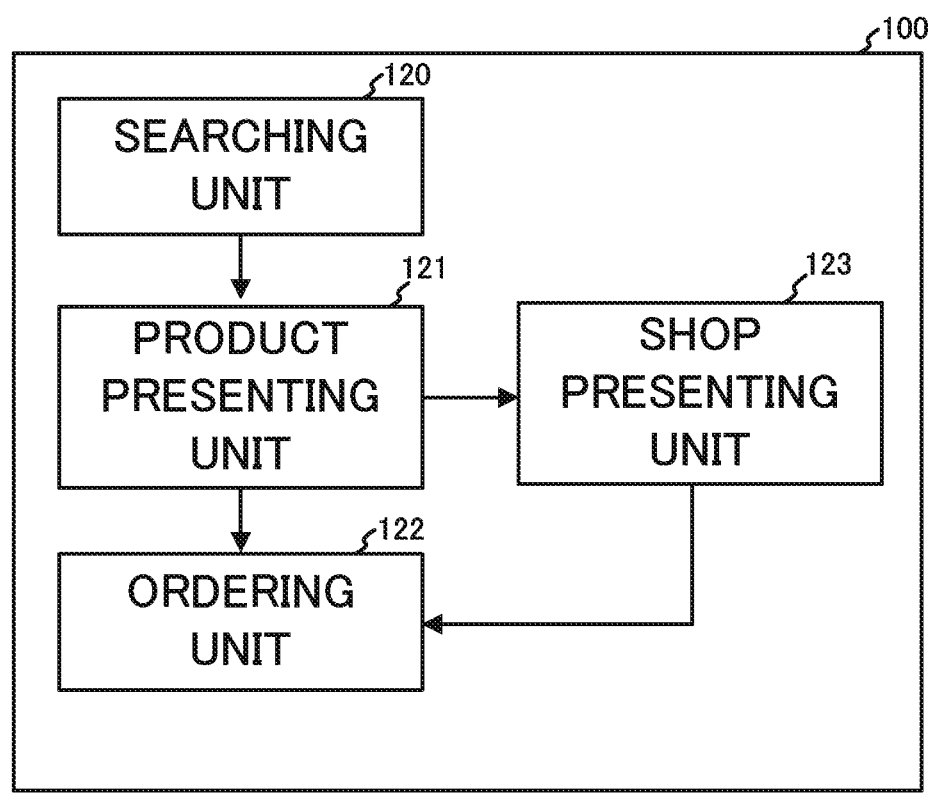
FIG. 3 is a schematic block diagram illustrating a functional configuration of a purchase management device.

FIG. 3 is a schematic block diagram illustrating a functional configuration of the purchase management device 100. As illustrated in FIG. 3, the purchase management device 100 is equipped with a searching unit 120, a product presenting unit 121, an ordering unit 122, and a shop presenting unit 123.

At this point, a method by which a shop registers product information in the product database 400 in an electronic marketplace will be described.

Specifically, the purchase management device 100 presents a product registration page 201 to a shop terminal 200, and the shop inputs information into the product registration page 201 displayed on the shop terminal 200 to register product information. FIG. 4 illustrates an example of the product registration page 201 provided to the shop terminal 200. The product registration page 201 is a page for registering a product name and product information, and is displayed on the display of the shop terminal 200. The shop inputs a title for a product the shop desires to sell, and product information, such as the price of the relevant product, into an input form 202 included on the product registration page 201 displayed on the display. The shop terminal 200 outputs the information input into the input form 202 to the purchase management device 100 via the Internet 500. Subsequently, the purchase management device 100 registers the information in the product database 400.

The searching unit 120 searches for products sold in the electronic marketplace. Herein, an electronic marketplace refers to a marketplace provided on the Internet that enables exchanges with businesses. When a customer inputs a designated query into a customer terminal 300, a search for products in the product database 400 provided in the electronic marketplace is initiated.

Figure 6:
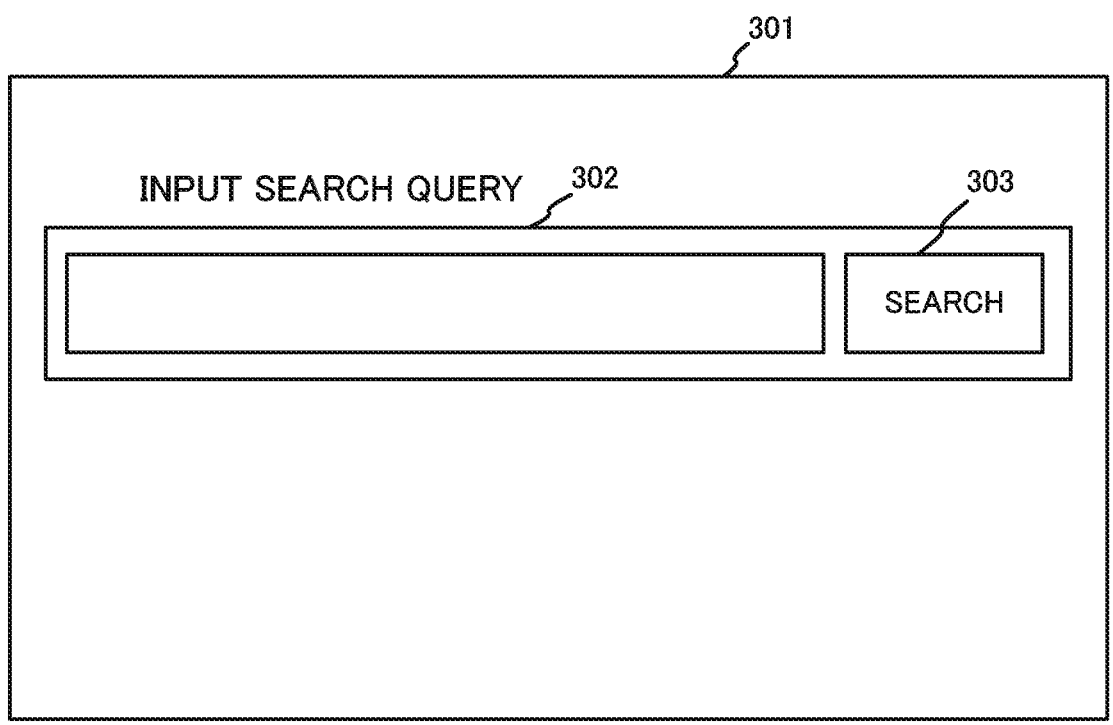
FIG. 6 is a diagram illustrating an example of a product search page.

The searching unit 120 first provides a product search page 301 to the customer terminal 300. FIG. 6 illustrates an example of the product search page 301 provided to the customer terminal 300. The product search page 301 illustrated in FIG. 6 is a page enabling the customer to input a query, and is displayed on the display of the customer terminal 300. When the customer inputs a query, such as a desired product name to search for, into an input form 302 on the displayed product search page 301 and selects a search button 303, the customer terminal 300 outputs the query input into the input form 302 to the searching unit 120.

Subsequently, after acquiring a query from the customer terminal 300, the searching unit 120 searches the product database 400 on the basis of the query. The searching unit 120 searches to determine whether or not information stored in the product database 400 includes a string matching the input query, and acquires a product that includes matching information. In addition, if the number of acquired products is more than one, the searching unit 120 sorts the products in a designated order, and acquires the products of a designated rank or higher.

In the present embodiment, the controller 101 and the communicator 105 cooperate to function as the searching unit 120.

Figure 7:
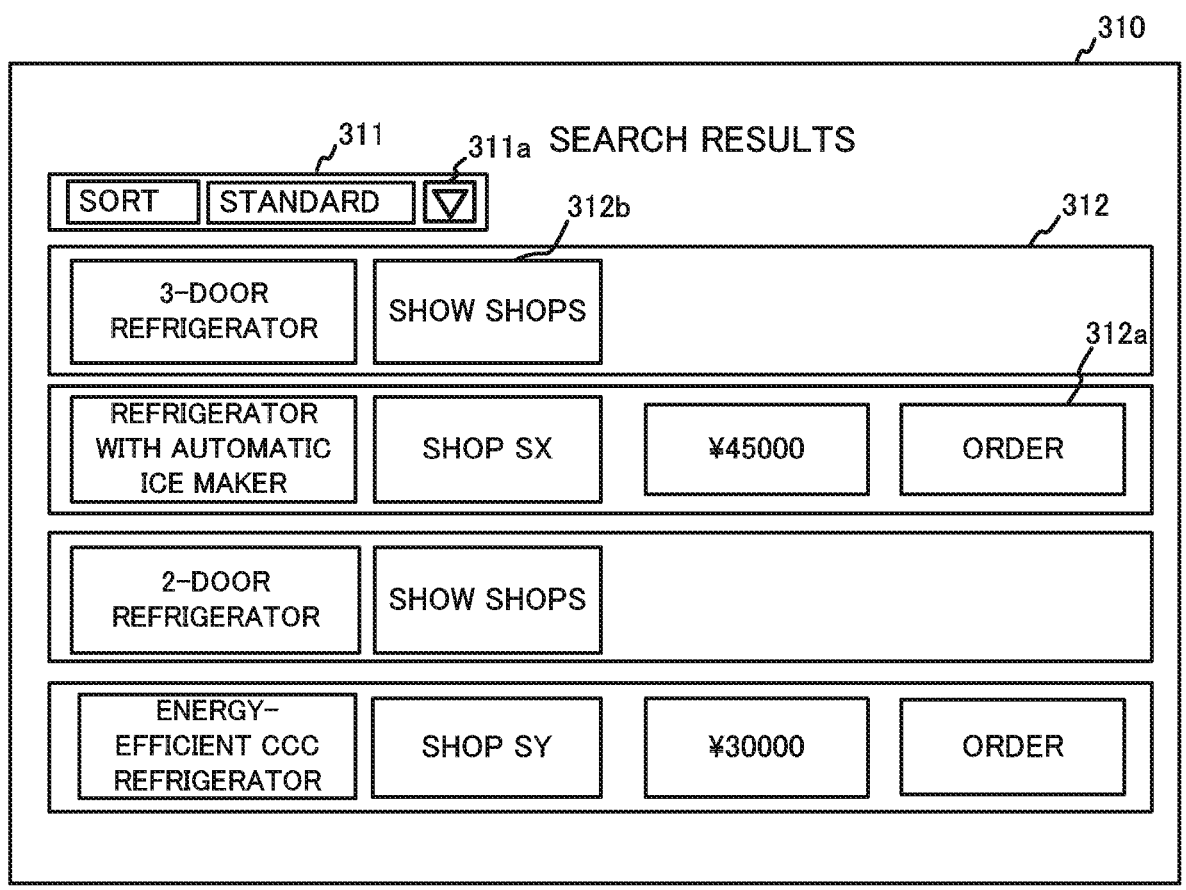
FIG. 7 is a diagram illustrating an example of a search results page.

The product presenting unit 121 presents products found by the searching unit 120 to the customer. Specifically, the product presenting unit 121 displays products found and acquired by the searching unit 120 on the display of the customer terminal 300 as a search results page 310. FIG. 7 illustrates an example of the search results page 310 presented to the customer terminal 300 by the product presenting unit 121.

The search results page 310 illustrated in FIG. 7 is made up of a search results sorter 311 and a search results display area 312. The search results sorter 311 is equipped with a sort button 311a enabling the customer to change the sort order of products displayed in the search results display area 312. By having the customer operate the sort button 311a, product sorting becomes possible.

Products found and acquired by the searching unit 120 are displayed in the search results display area 312. The display format of a product displayed in the search results display area 312 differs depending on whether the product is sold from a single shop or sold from multiple shops.

Specifically, if the product is sold from a single shop, the product presenting unit 121 causes the product name, the shop name, and the sale price to be displayed in the search results display area 312. The product name is the product name registered in the product database via the shop terminal 200. For example, the product name "Refrigerator with automatic ice maker" is displayed in the search results display area 312. Also, "Shop SX" is displayed as the shop name in the search results display area 312. It is sufficient for present a display enabling the product to be specified in the search results display area 312, and which fields to display may be arbitrarily decided by the operator of the electronic marketplace. In addition, the search results display area 312 may also be configured to include a purchase order button 312a that initiates a purchase order.

If the same product is sold from multiple shops, the product presenting unit 121 causes the product group name to be displayed as the product name in the search results display area 312. For example, if refrigerators having three doors are being sold from multiple shops, the product group name "3-door refrigerator" is displayed as the product name in the search results display area 312. The search results display area 312 additionally includes a view shops button 312b that specifically displays the multiple shops.

In the present embodiment, the controller 101, the display 104, and the communicator 105 cooperate to function as the product presenting unit 121.

If the customer selects a product from among the presented products, and the selected product is being sold from a single shop in the electronic marketplace, the ordering unit 122 initiates a purchase order for the product by the customer to the single shop.

Specifically, if a product presented by the product presenting unit 121 is a product sold from a single shop, the ordering unit 122 initiates a purchase order of the product as a result of the customer selecting that product. For example, the product "Refrigerator with automatic ice maker" displayed on the search results display area 312 in FIG. 7 is a product sold by the single shop SX. If the customer selects the product, a purchase order to the shop SX is initiated. For product selection, various methods may be adopted. A purchase order may be executed as a result of the customer selecting the shop name itself displayed on-screen, or as a result of the customer selecting a purchase order button 312a displayed on the search results display area 312.

If the customer selects a product, the ordering unit 122 outputs an indication that there is a purchase order for the product to the shop terminal 200 of the shop selling the relevant product. When there is a purchase order for a product, a sales page of a website operated by the selected shop may be linked to, and the sales page of the relevant shop may be displayed on the display of the customer terminal 300.

In the present embodiment, the controller 101 and the communicator 105 cooperate to function as the ordering unit 122.

If the selected product is being sold from multiple shops in the electronic marketplace, the shop presenting unit 123 presents the multiple shops to the customer in a first order.

Figure 9:
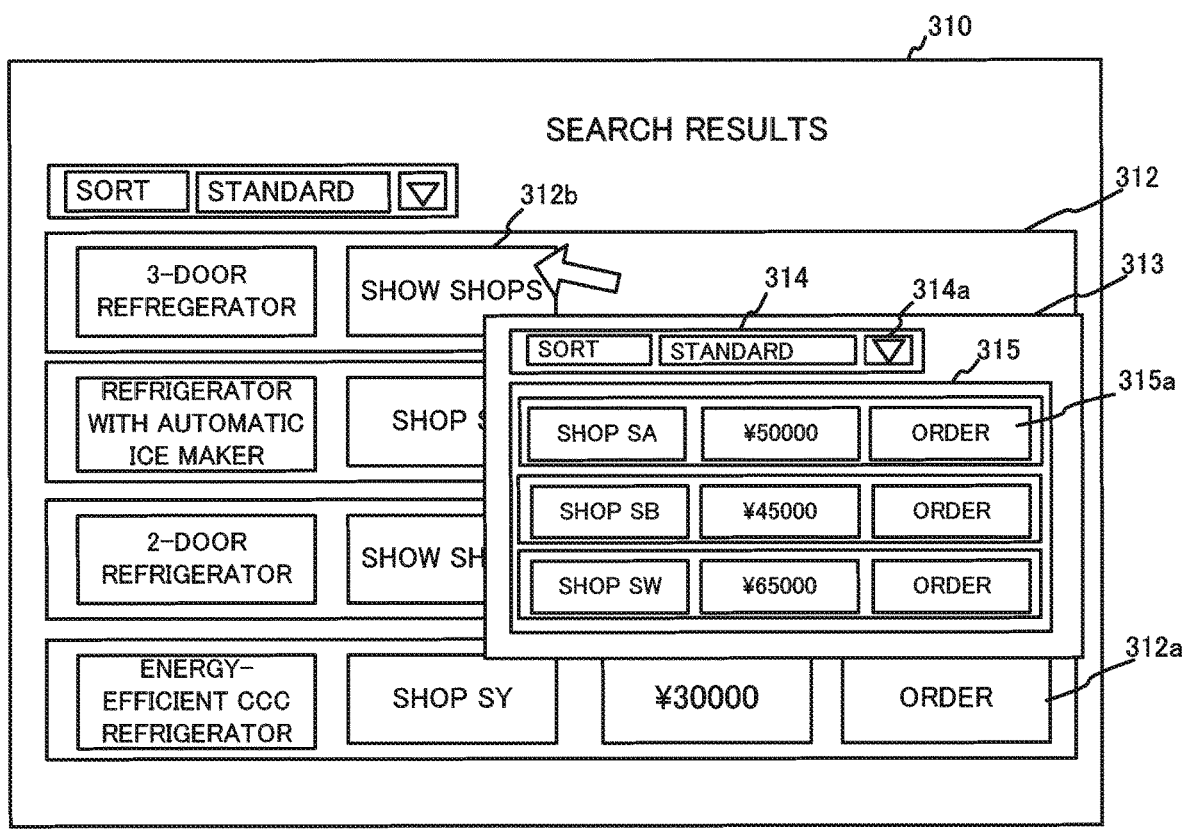
FIG. 9 is a diagram illustrating an example of a shop display area displayed on a search results page.

Specifically, the shop presenting unit 123 presents a shop display area 313 to the customer terminal 300. FIG. 9 illustrates an example of the shop display area 313 displayed on the customer terminal 300. The shop display area 313 is made up of a shop sorting area 314 and a shop list area 315. The shop sorting area 314, by being operated by the customer, sorts the order of shops being displayed into a different order. The display method of the shop list area 315 may adopt any method insofar as the shops are identified. As in the present embodiment, the shop name and the sale price of the product may be displayed in the shop list area 315. In addition, a purchase order button 315a may also be provided in the shop list area 315.

In the shop list area 315, multiple shops are displayed in a first order. The first order may be, for example, an order sorted by highest match rate of shops that sell a product having a high match rate with a query input by the customer and the string of the product name of the product stored in the product database 400.

In order to display the multiple shops presented by the shop presenting unit 123 on the display of the customer terminal 300, the customer performs a mouseover on the "Show shops" field displayed in the view shops area 312b, for example. By performing a mouseover on the "Show shops" field, the shop display area 313 displaying the multiple shops is displayed. For example, if a mouseover is performed on the "Show shops" field of the product "3-door refrigerator", shop names are displayed in the order of shop SA, shop SB, and shop SW. Note that displaying the shop display area 313 by performing a mouseover on the "Show shops" field is an example of displaying shop display area 313, and the shop display area 313 may also be displayed according to a cursor key operation by the customer.

If the customer selects a shop from among the presented shops, the ordering unit 122 initiates a purchase order for the product selected by the customer to the selected shop.

Specifically, if the customer selects a shop from among the multiple shops displayed on the shop display area 313 of the customer terminal 300, the ordering unit 122 initiates a purchase order. Various methods may be adopted for the purchase order, insofar as the method enables the selection of a shop presented by the shop presenting unit 123. A purchase order may be executed by selecting a shop name displayed on the shop display area 313, or by selecting the purchase order button 315a displayed on the shop display area 313.

In the present embodiment, the controller 101, the display 104, and the communicator 105 cooperate to function as the shop presenting unit 123.

Next, operation of a purchase management device 100 according to the present embodiment will be described.

Figure 10:
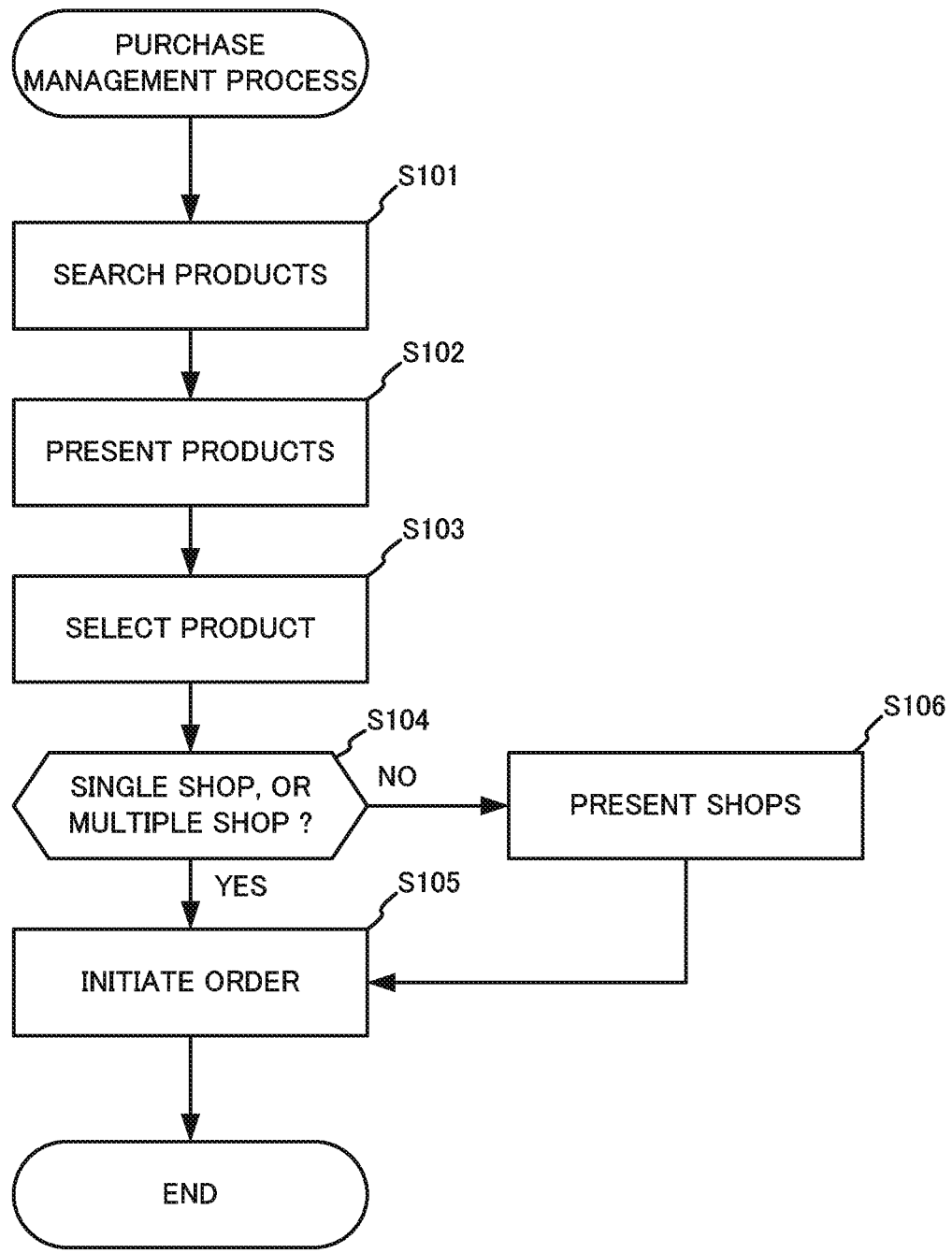
FIG. 10 is an example of a flowchart for a purchase management process.

A purchase management process executed by the controller 101 of the purchase management device 100 will be described. FIG. 10 is an example of a flowchart for a purchase management process. The purchase management process illustrated in FIG. 10 is started when triggered by receiving input requesting a product search page from the customer terminal 300, for example. In addition, this process is executed by the controller 101 loading a program stored in the ROM 102.

The searching unit 120 outputs the product search page 301 illustrated in FIG. 6 to the customer terminal 300. The customer inputs a query into the input form 302 on the product search page 301, the searching unit 120 determines whether or not a signal indicating that the search button 303 is selected has been received, and searches the product database 400 when triggered by receiving a signal indicating that the search button 303 is selected (step S101).

For example, if the customer inputs the query "refrigerator" and "door" into the input form 302, and selects the search button 303, the searching unit 120 searches the product database 400 for information including strings matching the query of "refrigerator" and "door". The searching unit 120 acquires a product on the basis of the information found by search, and if multiple products are acquired, sorts the products in a designated order.

Next, the product presenting unit 121 displays the products found and acquired by the searching unit 120 on the display of the customer terminal 300 (step S102). For example, found products are displayed in a designated order on the search results page 310 illustrated in FIG. 7.

Next, if the customer selects a desired product from among the products displayed on the search results page 310, the searching unit 120 outputs an indication that the product is selected to the ordering unit 122 (step S103).

Next, the ordering unit 122 judges whether the product selected by the customer is a product sold from a single shop or a product sold from multiple shops in the electronic marketplace (step S104).

Subsequently, if the ordering unit 122 judges that the product selected by the customer is sold from a single shop in the electronic marketplace (YES; step S104), the ordering unit 122 initiates an order to the relevant single shop (step S105).

On the other hand, if the ordering unit 122 judges that the product selected by the customer is sold from multiple shops in the electronic marketplace (NO; step S104), the shop presenting unit 123 presents the multiple shops to the customer in the first order (step S106).

Next, if the customer selects a shop from among the presented shops, the ordering unit 122 initiates a purchase order to the selected shop (step S105). The process then ends.

As described above, the purchase management device 100 according to the present embodiment, on the basis of a query specified by a customer, searches the product database 400 and presents found products to the customer. Subsequently, when a presented product is sold from a single shop, the purchase management device 100 initiates a purchase order to the single shop as a result of the customer selecting that product. Consequently, the customer is able to initiate a purchase order with the simple operation of selecting a product presented by the product presenting unit 121.

On the other hand, when the product selected by the customer is sold from multiple shops, the purchase management device 100 according to the present embodiment causes the shop presenting unit 123 to present the multiple shops to the customer in a first order. Consequently, the same products being sold from multiple shops are displayed collectively, and it is possible to subsequently display the multiple shops, enabling more types of products to be displayed at one time on the customer terminal 300.

The foregoing thus describes an embodiment of the present invention, but the present invention is not limited to the present embodiment. Hereinafter, modifications of the present embodiment will be described. Note that in the following modifications, structural elements that are similar to the foregoing embodiment are indicated using similar signs, and detailed description of such structural elements will be reduced or omitted.

Modification 1

In the foregoing embodiment the product presenting unit 121 presents products, and the shop presenting unit 123 presents multiple shops to the customer in a first order. However, the method by which the product presenting unit 121 presents products and the order in which the shop presenting unit 123 presents multiple shops may be limited further. For example, the product presenting unit 121 may present products in a first order, and the shop presenting unit 123 may present multiple shops selling products in a second order different from the first order.

An example of the product presenting unit 121 presenting products in a first order will be described using the search results page 310 illustrated in FIG. 7.

On the search results display area 312 of the search results page 310 illustrated in FIG. 7, products found by search are sorted in a first order. In the present modification, the first order is an order, sorted on the basis of a designated standard, of products having information that includes a string matching a query input by the customer, for example. For example, the first order may be in order of highest popularity of the product, or in order of products whose product name string has a high match rate. In the present modification, the first order is configured as the "standard".

Figure 8:
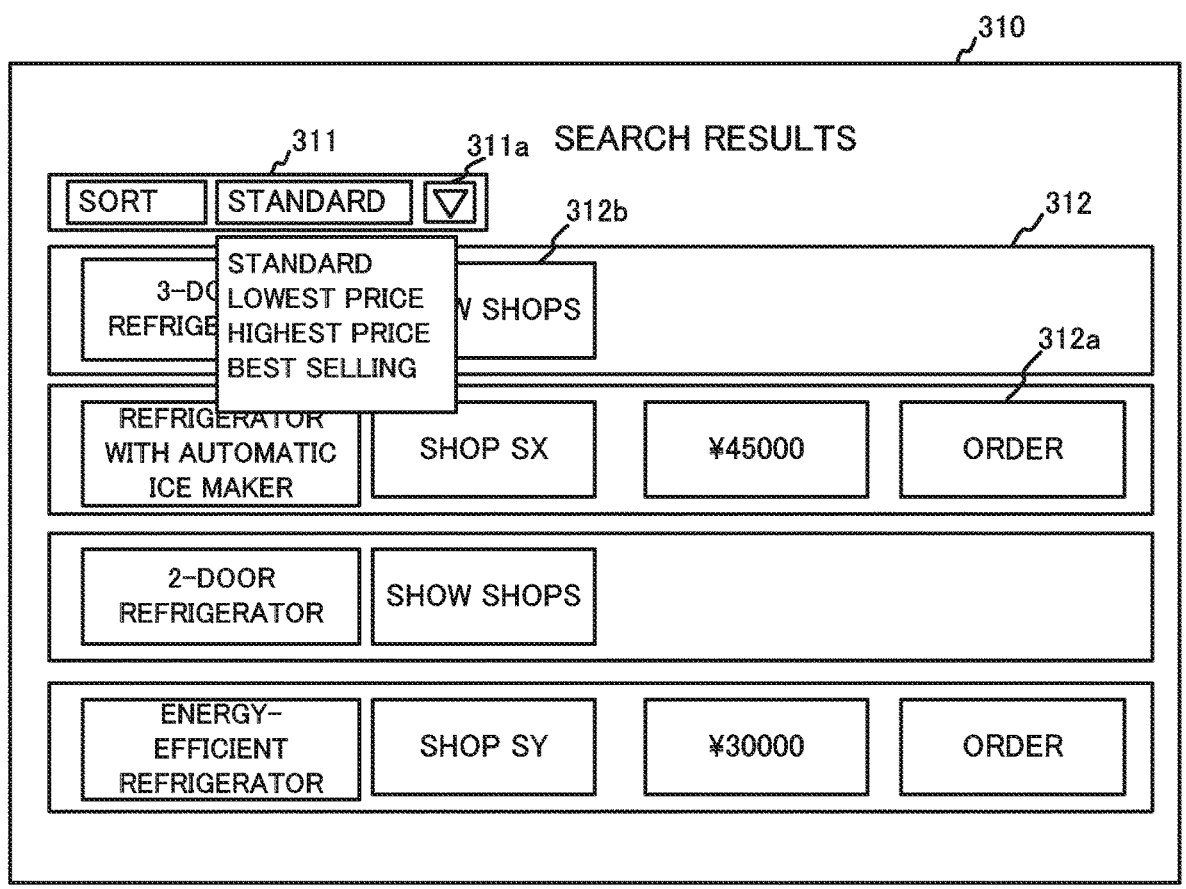
FIG. 8 is a diagram illustrating another example of a search results page.

In addition, by selecting the sort button 311a, the customer is able to sort the products in the search result in a designated order other than standard, or in other words, in an order that differs from the first order. FIG. 8 illustrates an example of the product presenting unit 121 presenting the presented products in a second order that differs from the first order. As illustrated in FIG. 8, when the customer selects the sort button 311a, sort candidates enabling sorting in an order other than standard are displayed. For example, items for sort candidates such as "Lowest price", "Highest price", and "Bestselling" are displayed in a drop-down menu. The customer, by selecting a desired candidate item, is able to sort the products in the search result in an order that is different from the first order, or in other words, the standard order. Note that products may also not be sorted by selecting an item of a sort candidate displayed in a drop-down menu. For example, an order that is different from the standard order may be preconfigured, and displayed automatically when the customer gives an instruction from the customer terminal 300 to sort in an order that is different from the standard order.

Next, an example of the shop presenting unit 123 presenting multiple shops selling products in a second order that differs from the first order will be described.

Figure 11:
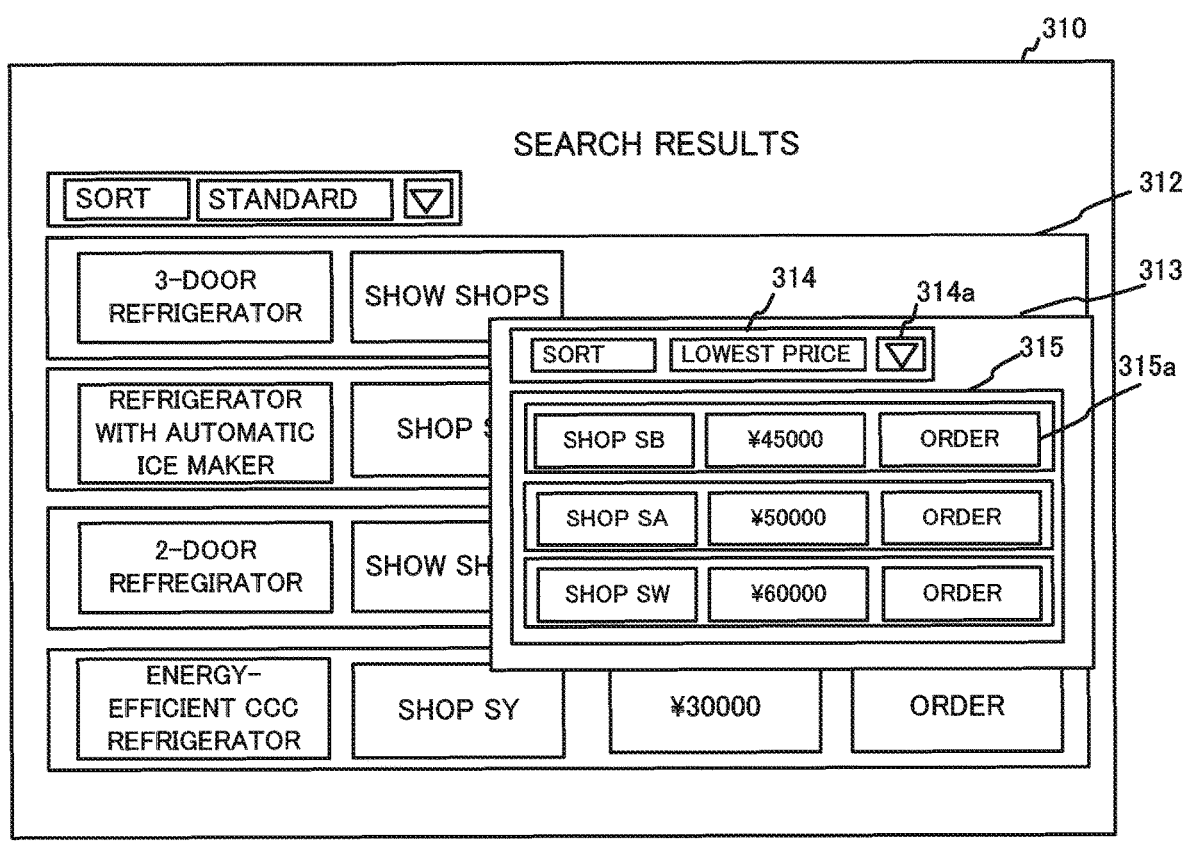
FIG. 11 is a diagram illustrating another example of a shop display area displayed on a search results page.

The shop sorting area 314 illustrated in FIG. 9 is provided with a sort button 314*a*, and if the customer selects the sort button 314*a*, the shop sorting area 314 is able to change the order in which shops are presented in the standard first order to a second order other than standard. The sort candidate items displayed as the second order may be, for example, in order of bestselling shop, product price, or highest customer satisfaction. FIG. 11 illustrates an example of the shop presenting unit 123 presenting shops in a second order.

Specifically, if the customer operates the sort button 314*a* in the shop display area 313 illustrated in FIG. 9, candidates for the second order, for example, candidate items for a second order such as in order of lowest price, are displayed, and if the customer selects one of the items, the shops are sorted according to that order, as illustrated in FIG. 11. In other words, in the shop display area 313 illustrated in FIG. 9, the shop names are displayed in the first or standard order of shop SA, shop SB, and shop SW. In the shop display area 313 illustrated in FIG. 11, the shop names are displayed in a second order by lowest price, in the second order of shop SB, shop SA, and shop SW.

By providing such a configuration, when the product presenting unit 121 presents multiple products, the customer is able to view the products in an order based on designated criteria, thereby enabling easy product selection. In addition, the customer is able to modify the order of shops presented by the shop presenting unit 123, thereby enabling easy shop selection.

Modification 2

In Modification 1, the product presenting unit 121 presents products in a first order, and the shop presenting unit 123 presents multiple shops selling products in a second order different from the first order. However, the first order in which products are presented and the second order in which shops are presented may also be limited by a method that additionally decides on the basis of specific scores. For example, the first order in which products are presented may be set to an order based on scores that reference match rates against an input query. In addition, the second order in which shops are presented may be set to an order based on scores that reference the price at which each of multiple shops sells the product being sold by the multiple shops.

When a product found by search is a product sold from a single shop, the searching unit 120 decides the first order on the basis of scores that reference the match rate of the product information against a query input by the customer. For example, if a product name is input as the query, the scores of the products found by search are decided on the basis of scores determined according to how much the input product name string matches a string included in the product name, product description, or the like in the product database 400. Product scores are similarly decided for all products found by search, and the order of the searched products is decided on the basis of the scores. The products are sorted on the basis of the decided first order, and presented to the customer terminal 300 by the product presenting unit 121.

If a product found by search is sold by multiple shops, the searching unit 120 decides the score of the product sold by each shop on the basis of scores determined according to the price of the products sold by the multiple shops. On the basis of the scores determined according to price, the searching unit 120 decides a score for each of the products sold by the multiple shops, and decides the order of the searched products on the basis of the scores. For example, as illustrated in FIG. 11, by having the customer select the sort button 314*a* and selecting "Lowest price" from among the sort candidate items, the shops may be sorted by referencing the scores determined according to the prices of the searched products.

By providing such a configuration, for products sold from single shops, the products are presented in order of highest match rate against the query input by the customer, and thus the customer is able to obtain search results that are close to the customer's purpose for searching. When the same product is being sold from multiple shops, the shops are presented in an order according to the sale price of the product, and thus the customer is able to select a shop by the sale price of the product, which is of utmost interest to the customer.

Modification 3

In Modification 1, the product presenting unit 121 presents products in a first order, with the first order being decided on the basis of the characteristics of the product itself, such as the sale price or how much a query and a string match, for example. However, the order may also be limited according to a factor other than the characteristics of the product itself. For example, the first order may also be determined on the basis of scores that reference whether the product is sold from a single shop or sold from multiple shops in the electronic marketplace.

Among the products presented by the product presenting unit 121, products sold from single shops and products sold from multiple shops are displayed mixed together, as indicated in the search results display area 312 illustrated in FIGS. 7 to 9 and FIG. 11. Additionally, the products sold from single shops and the products sold from multiple shops are sorted on the basis of a first order, according to the same criteria.

In the present modification, the scores are configured to differ according to whether the product is a product sold from a single shop, or a product sold from multiple shops. For example, for a product sold from a single shop, a low score is configured, whereas for a product sold from multiple shops, a high score is configured. Subsequently, the first order of the products is decided on the basis of the scores.

By providing such a configuration, it is possible to prevent a shop from intentionally causing the shop name to be displayed at a higher ranking by intentionally not assigning a product code and assigning a product name indicating the serial number of a manufacture product or the name of the manufacturer of a manufactured product as the product name.

Modification 4

In the present embodiment, the product presenting unit 121 presents multiple products when there are multiple products found by search. However, when the same product is being sold from multiple shops, the method of presenting products may be limited further. For example, in the electronic marketplace, if a first product code that a first shop assigns to a first product matches a second product code that a second shop assigns to a second product, the first product and the second product may be treated as the same product, and that same product may be treated as being sold by the first shop and the second shop.

A product code is a code assigned by the operator of the electronic marketplace or the shop itself, and when a first product code assigned to a first product of a first shop is the same as a second product code assigned to a second product of a second shop, the searching unit 120, the product presenting unit 121, the ordering unit 122, and the shop presenting unit 123 treat the first product and the second product as the same product.

For example, in the product database 400 illustrated in FIG. 5, the product code "M0001" is assigned to the product "3-door AAA refrigerator" sold by the shop SA, the product code "M0001" is assigned to the product "3-door BBB refrigerator" sold by the shop SB, and the product code "M0001" is assigned to the product "3-door CCC refrigerator" sold by the shop SW. In this way, since the same product code is assigned to the products sold by the shops SA, SB, and SW, these products are treated as the same product. Additionally, one product group name "3-door refrigerator" is assigned to products with the same assigned product code "M0001". Consequently, the products with the M0001 code assigned are displayed in the search results display area 312 under the title of the same product group name "3-door refrigerator".

By providing such a configuration, products having the same product code assigned may be collected under one product group name. Consequently, the number of types of products that may be displayed on the search results page may be increased, and in addition, processing such as product search and product sorting may be conducted efficiently.

Modification 5

In Modification 1, the first order in which the product presenting unit 121 presents products is in order of products whose product name string has the highest match against a query input by the customer. However, the first order may be decided not only with evaluation criteria about the product only, but also with evaluation criteria about the shop. For example, the searching unit 120 may calculate a score expressing the degree to which a combination of a product and a shop selling that product matches a query. The score in the first order of a product being sold by a single shop in the electronic marketplace may be treated as a score calculated for the combination of the product and the single shop. In addition, the score in the first order of a product being sold by multiple shops in the electronic marketplace may be treated as a representative value of scores calculated for each combination of the product and the multiple shops.

Specifically, the searching unit 120 separately calculates a score for the product (hereinafter called the "product score") and a score for the shop selling the product (hereinafter called the "shop score"), and combines both scores to calculate an total score.

Herein, the criteria of the product score are the product price, popularity, and the like, while the criteria of the shop score are the product selection, payment methods, customer service, and the like, for example. The searching unit 120 calculates a product score and a shop score on the basis of the match rate against a query input into the customer terminal, while also accounting for the respective criteria.

The score of a product being sold from a single shop is calculated by the searching unit 120 by combining the product score of the product itself for each product found by search with the shop score of the shop with the shop score of the shop selling that product.

FIG. 12 is a diagram illustrating an example of a score chart for products being sold at single shops. As illustrated in FIG. 12, the score chart is made up a product name, a product score, a shop name, a shop score, and a total score.

For example, the searching unit 120 references the scores set for each product and calculates a product score for each of a refrigerator with an automatic ice maker, an energy-efficient CCC refrigerator, and a refrigerator CCC for a single-person household found and acquired on the basis of a query input by the customer. Furthermore, the searching unit 120 references the scores set for each shop and calculates a shop score for each of the shops SX, SY, and SZ that sell these products. Subsequently, the searching unit 120 calculates total scores from the product scores and the shop scores, and determines a first order from the total scores. In the present modification, from the calculated total scores, the products are arranged from highest-ranking to lowest-ranking in the order of the a refrigerator CCC for a single-person household, the refrigerator with an automatic ice maker, and the energy-efficient CCC refrigerator.

For the score of a product being sold from multiple shops, the product score of the product and the shop score of the multiple shops are calculated by the searching unit 120 for each product group of the found and acquired products. Subsequently, a representative value of the total score is taken to be the score of that product group.

FIG. 13 is a diagram illustrating an example of a score chart for products being sold at multiple shops, and is a score chart for a case in which a 3-door refrigerator is sold by multiple shops. As illustrated in FIG. 13, when a 3-door refrigerator is being sold by multiple shops, the searching unit 120 calculates a product score and a shop score for each product of each of the multiple shops SA, SB, SW, and soon, and finally computes total scores. The searching unit 120 computes a representative value from the computed total scores, and treats the representative value as the score for the 3-door refrigerator. The representative value is a value expressed by an average value, minimum value, maximum value, weighted average value, median value, or the like of the total scores.

FIG. 14 is a diagram illustrating another example of a score chart for products being sold at multiple shops, and is a score chart for a case in which a 2-door refrigerator is sold by multiple shops. As illustrated in FIG. 14, when a 2-door refrigerator is being sold by multiple shops, the searching unit 120 calculates a product score and a shop score for each product of each of the multiple shops SE, SD, and so on, and finally computes total scores. The searching unit 120 computes a representative value from the computed total scores, and treats the representative value as the score for the 2-door refrigerator.

FIG. 15 is a diagram illustrating another example of a score chart for products being sold at multiple shops, and is a score chart for a case in which a right-hand refrigerator is sold by multiple shops. As illustrated in FIG. 15, when a right-hand refrigerator is being sold by multiple shops, the searching unit 120 calculates a product score and a shop score for each product of each of the multiple shops SF, SC, and so on, and finally computes total scores. The searching unit 120 computes a representative value from the computed total scores, and treats the representative value as the score for the right-hand refrigerator.

The searching unit 120 compares the scores of the representative values for each of the 3-door refrigerator, the 2-door refrigerator, and the right-hand refrigerator, and decides an order within the product group.

The searching unit 120 resorts the products sold by single shops and the products sold by multiple shops on the basis of the scores computed according to the above methods. Subsequently, the searching unit 120 decides an order among the products sold by single shops and the products sold by multiple shops. The product presenting unit 121 presents the products to the customer terminal 300 according to the decided order.

Note that if a product is being sold by a single shop, the score for the product may be calculated according to the product and the degree of popularity of the shop. Also, if a product is being sold by multiple shops, the score for the product may be calculated using the product and an average value, median value, mode value, or the like of the popularity of the shops.

In addition, the score for a product may be calculated by also taking the price into account. In other words, if a product is being sold by a single shop, the score for the product is calculated so that the price of the product is itself reflected in the score. If a product is being sold by multiple shops, the score for the product may be calculated using an average value, median value, mode value, or the like of the product being sold by all shops. Note that when a product is sold from multiple shops, and a score is calculated according to the price of the product to present the product, the shop presenting unit 123 may also present the shops in an order according to the price of the product.

Next, operation of a score calculation process by a purchase management device 100 according to the present modification will be described.

Figure 16:
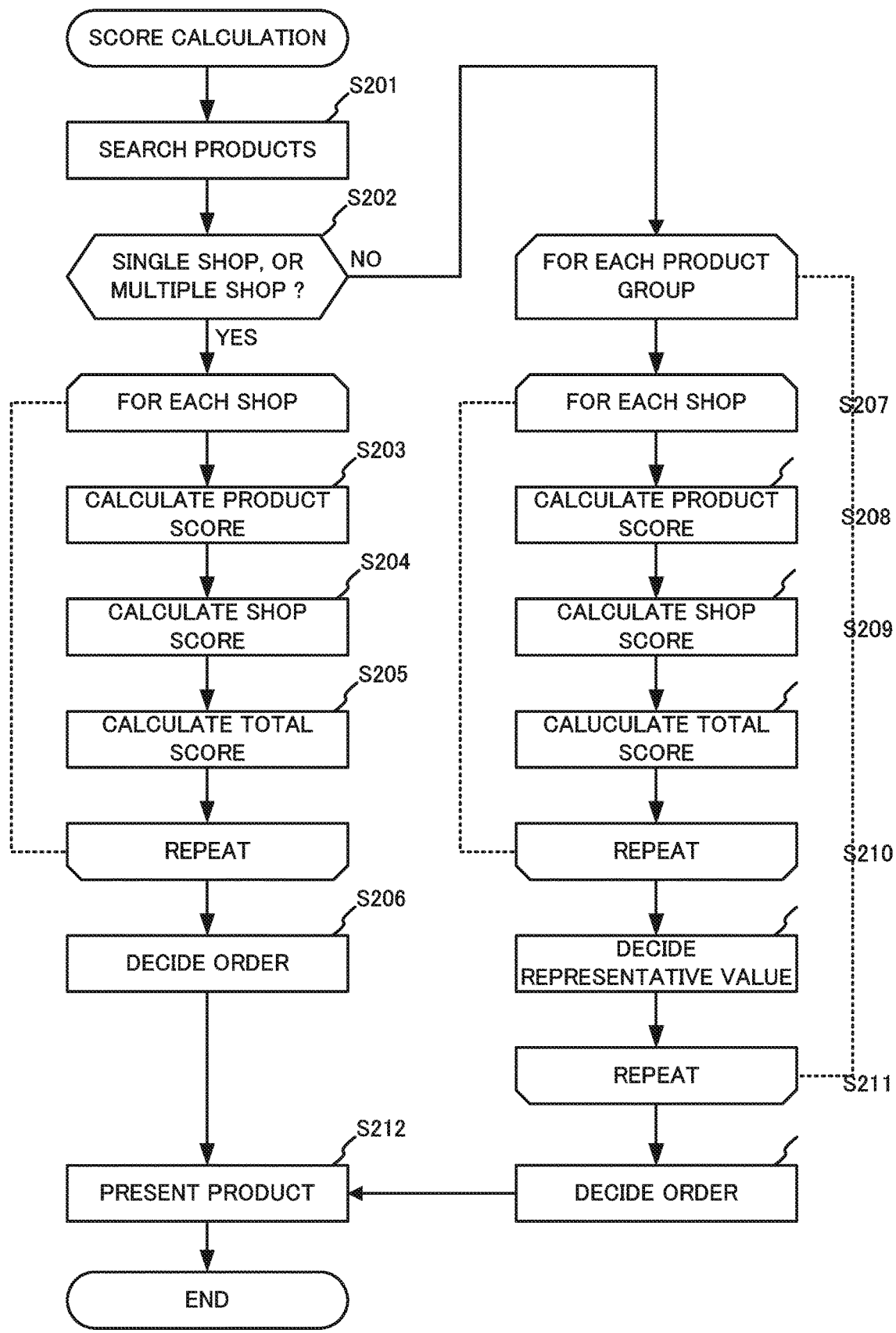
FIG. 16 is an example of a flowchart for a score calculation process.

A purchase management process executed by the controller 101 of the purchase management device 100 will be described. FIG. 16 is an example of a flowchart for a score calculation process. The score calculation process illustrated in FIG. 16 is started when triggered by receiving input requesting a product search page from the customer terminal 300, for example. In addition, this process is executed by the controller 101 loading a program stored in the ROM 102.

The searching unit 120 searches the product database 400 on the basis of the query input into the customer terminal 300, and acquires products (step S201).

Next, the searching unit 120 judges whether a found and acquired product is a product sold from a single shop, or a product sold from multiple shops (step S202).

Subsequently, if the acquired product is a product sold from a single shop (YES; step S202), the searching unit 120 calculates a product score for each acquired product (step S203), subsequently calculates a shop score for each acquired product (step S204), and from the calculated product score and shop score, calculates an total score for the product (step S205). This is repeated for each acquired product to decide the order of the acquired products (step S206).

If the acquired product is a product sold from multiple shops (NO; step S202), the searching unit 120 calculates a product score for a specific product included in a designated product group (step S207), subsequently calculates a shop score for the product (step S208), and from the calculated product score and shop score, calculates an total score for the product (step S209). This is repeated for each acquired product to decide a representative value of the designated product group (step S210). This process is repeated for each product group to decide the order among the product groups (step S211).

Subsequently, the searching unit 120 decides the overall order, taking into account the order decided for the products sold by single shops and the order decided for the products sold by multiple shops. The product presenting unit 121 presents the products to the customer terminal 300 according to the decided order (step S212). The process then ends.

By providing such a configuration, the product presenting unit 121 is able to present products in an order that also takes the shop rating into account when presenting products found and acquired by search, and the customer is able to make a comprehensive judgment about the presented products, and select a product to purchase.

Modification 6

In the foregoing embodiment, if a product found by search is being sold from a single shop, and the customer selects the product, the ordering unit 122 initiates a purchase order for the product to the shop. In addition, if a product found by search is being sold from multiple shops, and the customer selects a shop from among the presented shops, the ordering unit 122 initiates a purchase order for the product selected by the customer to the selected shop. However, the purchase order method may be limited further.

For example, the ordering unit 122 may also initiate a purchase order by displaying a sales page for selling the selected product, created by the shop to receive the purchase order. In addition, the shop presenting unit 123 may also present, to the customer, common information associated with the product code assigned to the selected product, together with the multiple shops selling the selected product. In addition, on the basis of an instruction by any of the multiple shops or the customer, the purchase management device 100 may also extract information other than the common information associated with the product code of the product sold on the sales page from among the information included in the sales page, and present the extracted information to the person who gave the instruction.

Figure 17:
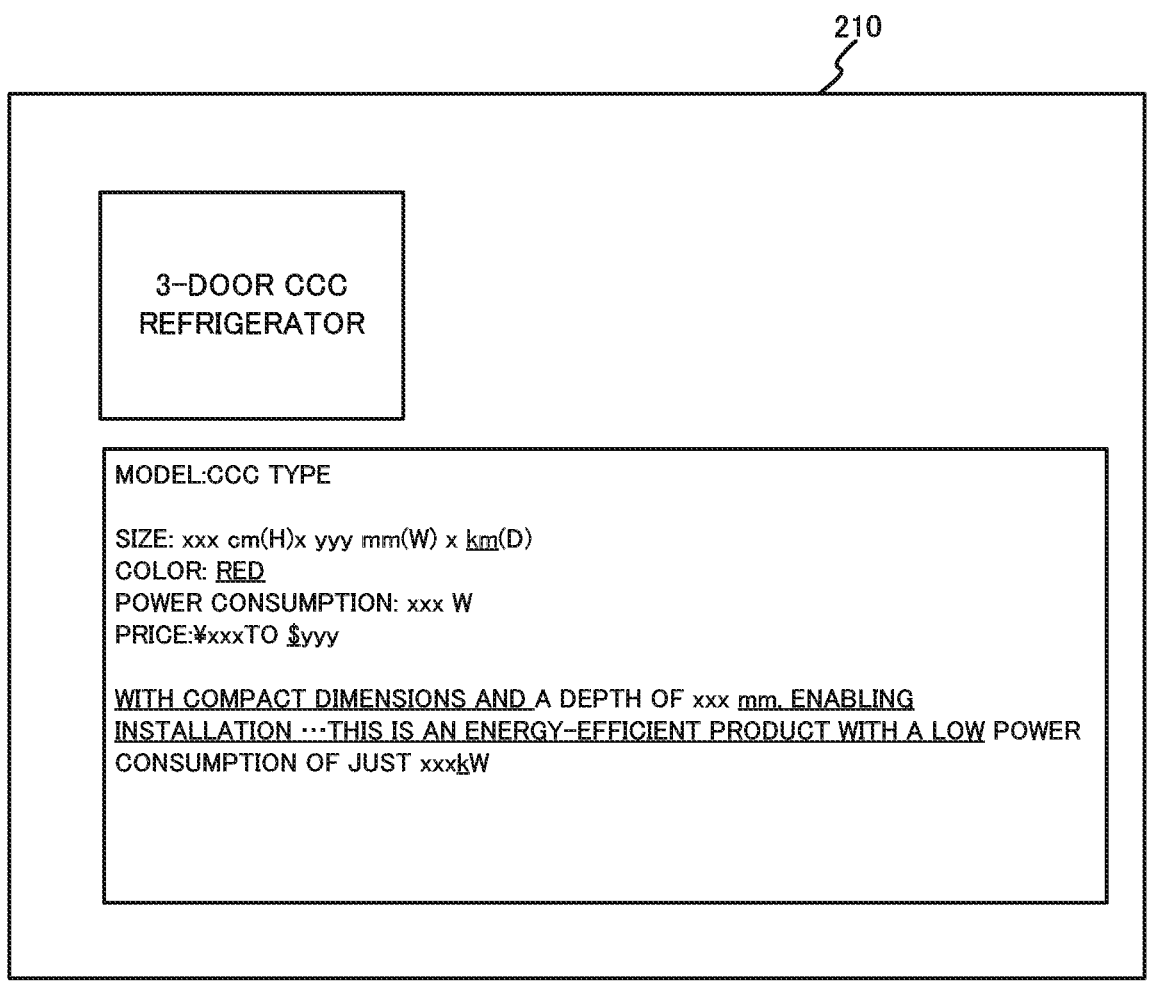
FIG. 17 is a diagram illustrating an example of a sales page.

FIG. 17 is a diagram illustrating an example of a sales page 210 created by a shop on the shop terminal 200. On the sales page 210, the shop is able to input arbitrary information such as a product name and specific information related to the product, such as the model, size, and color of the product, and a promotion or the like, for example.

If the customer selects a product being sold by a single shop, the ordering unit 122 displays a sales page created by that shop, and initiates a purchase order. For example, on the search results page 310 in FIG. 7, if the customer selects the purchase order button 312*a* for the product "Refrigerator with automatic ice maker" being sold by a single shop, the screen moves to the linked homepage of the shop. Subsequently, the shop's sales page is displayed on the display of the customer terminal 300, and a purchase order is initiated at that time.

If the shop presenting unit 123 presents multiple shops and the customer selects one of the shops, the ordering unit 122 displays a sales page created by that shop on the display of the customer terminal 300, and initiates a purchase order.

Figure 18:
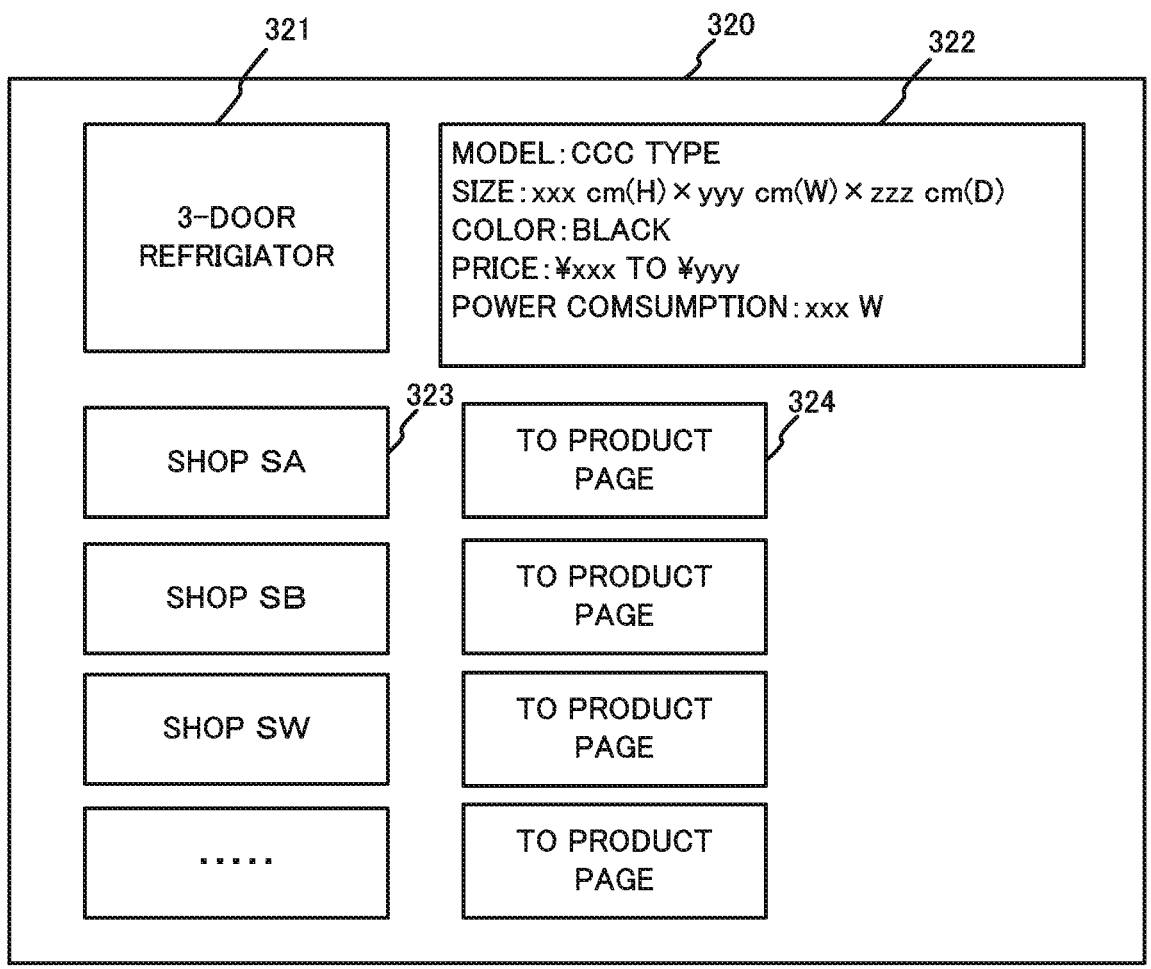
FIG. 18 is a diagram illustrating another example of a shop display area displayed on a search results page.

Specifically, the shop presenting unit 123 presents the shop display area 320 illustrated in FIG. 18 instead of the shop display area 313 illustrated in FIG. 9.

FIG. 18 is a diagram illustrating an example of the shop display area 320. The shop display area 320 is made up of a product group name display area 321, a common information display area 322, a shop name display area 323, and a product page link area 324. A product group name corresponding to the product code of the product selected by the customer is displayed in the product group name display area 321, while common information about the product corresponding to the product code is displayed in the common information display area 322, and a shop name selling the product selected by the customer is displayed in the shop name display area 323. The product page link area 324 is linked to the sales page of a shop selling the selected product, and if the customer selects the product page link area 324, the screen moves to the sales page of that shop.

In the present modification, "3-door refrigerator" is displayed as the product group name in the shop display area 320, and information such as the model, size, color, and price of the 3-door refrigerator is displayed as the common information. The common information is information stored in the "product description" of the product database 400 in advance, in association with the product code.

Also, on the search results page 310 in FIG. 7, if the customer selects the view shops button 312b labeled "Show shops" for the product "3-door refrigerator", the shop presenting unit 123 displays the shop display area 320 illustrated in FIG. 18 on the display of the customer terminal 300. Subsequently, if the customer selects the product page link area 324 of a designated shop, the screen moves to the sales page 210 of that shop, and the ordering unit 122 initiates a purchase order. Note that the purchase order may be executed by various methods. The purchase order may be executed by selecting the product page link area 324, or executed by selecting the shop name display area 323.

The shop display area 320 may be viewed by not only the customer, but also the shops. By accessing the purchase management device 100 from the shop terminal 200, a shop is able to check the content of the common information displayed in the shop display area 320.

In addition, if multiple shops issue an instruction to extract information other than the common information from the shop terminal 200 to the purchase management device 100, the purchase management device 100 extracts information other than the common information from among the information included on the sales page 210, and presents that information to the shop.

Specifically, the purchase management device 100 compares the content of the common information displayed on the common information display area 322 in FIG. 18 to the content stated in the sales page 210 in FIG. 17, and extracts the portions that are different. Subsequently, as illustrated in FIG. 17, the purchase management device 100 underlines the portion of the stated content of the sales page 210 that is different from the common information, indicating that the information in the underlined portions is information other than the common information.

Similarly, if a customer issues an instruction to extract information other than the common information from the shop terminal 200 to the purchase management device 100, the purchase management device 100 extracts information other than the common information from among the information included on the sales page 210, and presents that information to the customer.

By providing such a configuration, the customer is able to view common information as well as information on a sales page created by the shops themselves, and obtain more information about the product.

A shop is able to check that information other than the common information is included on the sales page created by that shop itself, and is able to check the differences between the common information and the sales page. For example, a shop is able to check for mistakes in the content stated as the common information. Likewise, by checking the information other than the common information, the customer may also easily check what information is unique to the sales page.

Note that although the foregoing embodiment and modifications describe the searching unit 120 as deciding the order of products or shops and calculating scores, the product presenting unit 121 may also be configured to perform similar functions.

Note that in the foregoing embodiment, a program executed by the purchase management device 100 may also be stored and distributed on a non-transitory computer-readable recording medium such as a flexible disk, a Compact Disc-Read-Only Memory (CD-ROM), a Digital Versatile Disc (DVD), or a magneto-optical (MO) disc. Additionally, the purchase management device 100 that executes the processing discussed earlier may be configured by installing the program onto an information processing device such as a personal computer.

Also, in the case in which the functions discussed earlier are realized under the supervision of an operation system (OS) or realized by cooperative action between an OS and an application, it is possible for only the program other than the portions that realize the OS functions to be stored and distributed on a non-transitory recording medium, or downloaded.

The foregoing describes some example embodiments for explanatory purposes. Although the foregoing discussion has presented specific embodiments, persons skilled in the art will recognize that changes may be made in form and detail without departing from the broader spirit and scope of the invention.

Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure applies to e-commerce using a network such as the Internet.

REFERENCE SIGNS LIST

1 Purchase management system
100 Purchase management device
101 Controller
102 ROM
103 RAM
104 Display
105 Communicator
106 Operation hardware
107 Bus
120 Searching unit
121 Product presenting unit
122 Ordering unit
123 Shop presenting unit
200 Shop terminal
201 Product registration page
202 Input form
300 Customer terminal
301 Product search page
302 Input form 303 Search button
310 Search results page
311 Search results sorter
311a Sort button
312 Search results display area
312a Purchase order button
312b View shops button
313 Shop display area
314 Shop sorting area
314a Sort button
315 Shop list area
315a Purchase order button
320 Shop display area
321 Product group name display area
322 Common information display area
323 Shop name display area
324 Product page link area
400 Product database
500 Internet

The invention claimed is:

1. A search method performed by a search device, wherein the search device includes a controller and a memory, and wherein the search method is performed by the controller executing a program stored in the memory, the search method comprising:
   receiving a query from a terminal;
   obtaining search results matching the received query;
   determining, by the search device and before a providing of the search results to the terminal:
      i) that a first product matching the query is sold by a plurality of shops,
      ii) that the plurality of shops includes a first seller and a second seller, and
      iii) that a second product matching the query is sold only by the first seller,
   generating an interface including the search results, wherein the interface is configured to present:
      A) a first result associated with a first page of the first seller, and
      B) a second result associated with a plurality of pages, wherein the second result includes a user interface operable object for operation by a user, the user interface operable object configured to provide access to an underlying interface, the underlying interface aggregating a list of the plurality of shops,
   wherein a second page of the plurality of pages is associated with the second seller and the first product;
   providing, after the determining by the search device that the first product matching the query is sold by the plurality of shops, the interface to the terminal;
   receiving, at the search device, a first selection from the interface of the first result;
   providing to the terminal the first page associated with the first result;
   detecting, at the search device, a mouseover with respect to the second result; and
   providing, within the interface, the underlying interface as a window including the list of the plurality of shops, wherein the list contains a plurality of links associated with the plurality of pages respectively.

2. The search method of claim 1, wherein the first result indicates the first product and the second product.

3. The search method of claim 1, wherein the list identifies the first seller as selling the first product and identifies the second seller as selling the first product.

4. The search method of claim 3, wherein the link is associated with a product page of the first seller.

5. The search method of claim 1, wherein the query is submitted to a shopping site.

6. The search method of claim 1, wherein the query is submitted to an auction site.

7. The search method of claim 1, wherein the program enables a user of the search device to search for a product that the user wants to purchase.

8. The search method of claim 1, wherein the program enables a user of the search device to search for a product in an electronic marketplace.

9. The search method of claim 1, wherein the program enables a user of the search device to manage a purchase.

10. The search method of claim 1, further comprising:
   receiving, at the search device, a third selection of a link from the list; and
   providing to the terminal a page associated with the selected link.

11. A non-transitory computer readable medium containing program code for execution by at least one processor of a search device, the computer program code including:
   search code configured to cause at least one of the at least one processor to:
      receive a query from a terminal,
      obtain search results matching the received query,
      determine, by the search device and before a providing of the search results to the terminal:
         i) that a first product matching the query is sold by a plurality of shops,
         ii) that the plurality of shops includes a first seller and a second seller, and
         iii) that a second product matching the query is sold only by the first seller,
      generate an interface including the search results, wherein the interface is configured to present:
         A) a first result associated with a first page of the first seller, and
         B) a second result associated with a plurality of pages, wherein the second result includes a user interface operable object for operation by a user, the user interface operable object configured to provide access to an underlying interface, the underlying interface aggregating a list of the plurality of shops,
      wherein a second page of the plurality of pages is associated with the second seller and the first product; and
   presenting code configured to cause at least one of the at least one processor to:
      provide, after the determining by the search device that the first product matching the query is sold by the plurality of shops, the interface to the terminal,
      receive, at the search device, a first selection from the interface of the first result, provide to the terminal the first page associated with the first result,
      detect, at the search device, a mouseover with respect to the second result, and
      providing, within the interface, the underlying interface as a window including the list of the plurality of shops, wherein the list contains a plurality of links associated with the plurality of pages respectively.

12. A search device comprising:
   at least one memory configured to store computer program code; and
   at least one processor configured to read the computer program code and operate according to the computer program code, the computer program code including:
   search code configured to cause at least one of the at least one processor to:
      receive a query from a terminal, obtain search results matching the received query,
determine, by the search device and before a providing of the search results to the terminal:
  i) that a first product matching the query is sold by a plurality of shops,
  ii) that the plurality of shops includes a first seller and a second seller, and
  iii) that a second product matching the query is sold only by the first seller,
generate an interface including the search results, wherein the interface is configured to present:
  A) a first result associated with a first page of the first seller, and
  B) a second result associated with a plurality of pages, wherein the second result includes a user interface operable object for operation by a user, the user interface operable object configured to provide access to an underlying interface, the underlying interface aggregating a list of the plurality of shops,
    wherein a second page of the plurality of pages is associated with the second seller and the first product; and
presenting code configured to cause at least one of the at least one processor to:
  provide, after the determining by the search device that the first product matching the query is sold by the plurality of shops, the interface to the terminal,
  receive, at the search device, a first selection from the interface of the first result,
  provide to the terminal the first page associated with the first result,
  detect, at the search device, a mouseover with respect to the second result, and
  provide, within the interface, the underlying interface as a window including the list of the plurality of shops, wherein the list contains a plurality of links associated with the plurality of pages respectively.

* * * * *